United States Patent Office

Re. 25,695

Reissued Dec. 8, 1964

25,695

EXPLOSIVE COMPOSITION COMPRISING AMMONIUM NITRATE AND HEAT-PRODUCING METAL

Melvin A. Cook, Salt Lake City, Utah, and Henry E. Farnam, Jr., Seven Islands, Saguenay, Quebec, Canada, assignors to Iron Ore Company of Canada, Wilmington, Del., a corporation of Delaware No Drawing. Original No. 3,121,036, dated Feb. 11, 1964, Ser. No. 766,729, Oct. 13, 1958. Application for reissue Apr. 23, 1964, Ser. No. 372,443
Claims priority, application Canada Feb. 28, 1958
12 Claims. (Cl. 149—21)

Matter enclosed in heavy brackets [ ] appears in the original patent but forms no part of this reissue specification; matter printed in italics indicates the additions made by reissue.

This invention relates to an improved slurry explosive composition and more particularly to an explosive composition comprising ammonium nitrate, a heat producing metal such as aluminum, and water.

Aluminum has long been known and used as an important "strength" enhancing ingredient in many explosives for military and commercial [used] *uses*. The increased strength resulting by the use of aluminum in explosives is the result of the highly exothermal reaction $$2Al+3(O)\rightarrow Al_2O_3(c) \qquad (1)$$

where (O) refers to oxygen derived in one way or another from the explosive. So strongly exothermal is this reaction that aluminum is found to increase the "strength" even of strongly oxygen negative explosives. For example, 80/20 tritonal (80 percent trinitrotoluene-20 percent aluminum) is appreciably stronger than trinitrotoluene itself despite the fact that the addition of aluminum to trinitrotoluene renders the oxygen balance considerably more negative than for pure trinitrotoluene. Since the presence of aluminum in such explosives actually robs the products of detonation of such components as carbon dioxide and water, the formation of which produces most of the heat of explosion in ammonium nitrate-fuel explosives, there is the possibility that a "balanced" (50/50) aluminum-water mixture might itself be explosive under appropriate conditions. Thus the reaction $$2Al+3H_2O\rightarrow Al_2O_3(c)+3H_2 \qquad (2)$$

generates a heat of 1.76K cal./g. Also the reaction $$3CO_2+4Al\rightarrow 3C+2Al_2O_3 \qquad (3)$$

generates 2.1K cal./g. These heats are about twice the heat of explosion of average dynamites and low density trinitrotoluene.

Another example, showing that ordinary concepts of oxygen balance do not apply in aluminum explosives is that the nearly "oxygen balanced" 20/80 aluminum-ammonium nitrate mixture generates much less heat then the 40/60 aluminum-ammonium nitrate mixture, i.e., the reactions $$2Al+3NH_4NO_3\rightarrow 3N_2+6H_2O(g)+Al_2O_3 \qquad (4)$$

and $$2Al+NH_4NO_3\rightarrow N_2+2H_2+Al_2O_3 \qquad (5)$$

yield the heats of reaction of 1.65K cal./g. and 2.3K cal./g., respectively.

Reaction (2) of aluminum and water is a well known source of heat. But the reaction by itself does not produce explosion under any yet known conditions owing apparently to an excessive activation energy and therefore low rate of reaction. Nevertheless the water-aluminum reaction offers the possibility of building water compatability into an explosive. Several investigators have reported negative results not only in attempts to detonate aluminum-water mixtures but also aluminum aqueous ammonium nitrate solutions and aluminum-ammonium nitrate-water slurries.

The difficulties in detonating aluminum-water and aluminum-aqueous ammonium nitrate mixtures resides to some extent in the difficulties in obtaining mixtures that do not have excessive aluminum. Aluminum has a specific gravity of 2.7 g./cc. and a granular, non-porous aluminum has a bulk density around half to two thirds this amount. Therefore, if one simply pours water or a clear, saturated ammonium nitrate solution over a sample of powdered aluminum, the amount of water or saturated ammonium nitrate solution required to cover the aluminum with a fluid "blanket" amounts to only about 30 to 40 parts water to 100 parts aluminum or 40 to 50 parts saturated ammonium nitrate solution to 100 parts aluminum. A "balanced" aluminum-water mixture has 100 parts water for 100 parts aluminum and a "balanced" aluminum 50/50 ammonium nitrate-water solution has about 125 parts [ammonium] *aluminum*. If, however, one were to use a fine grained, porous aluminum material of bulk density, for example, 0.7 g. per cc. water blanketing of the aluminum and would produce a mixture having 0.7 aluminum and 0.74 g. water per cc., and the overall composition would be 48.5/51.5 aluminum-water which theoretically is close to optimum for explosion of this particular mixture. Likewise a porous aluminum material of bulk density 0.7 blanketed by a (room temperature) saturated ammonium nitrate solution would have 0.7 g. aluminum/cc., and about 0.95 ammonium nitrate solution/cc., and the overall composition would be about 42.5/34.5/23 aluminum-ammonium nitrate/water, also a close to optimum mixture as regards expossibility for a clear solution of AN (*ammonium nitrate*). These compositions are, in other words, approximately "balanced" with respect to the reactions (2) and (3) above.

In agreement with previous experience we have been unable to detonate a 48.5/51.5 aluminum-water mixture even in 9" diameter charges. However, we were successful in detonating a 28/42/28 aluminum-ammonium [nitrate-water mixture even in 9" diameter charges. How-] nitrate-water mixture in a 9"(d) x 35"(L) charge, using a 50/50 mixture of fine, granular aluminum and aluminum shavings. While this illustrates the fact that these mixtures are explosive, we of course, prefer to use mixtures containing considerably more ammonium nitrate and less water, i.e., water at a percentage from 6 to 12 percent. Not only are such mixtures more economical, but they are also considerably more sensitive. Hence our invention emphasizes the use of ammonium nitrate slurries containing aluminum and similar metals.

We have discovered that, if a mixture of ammonium nitrate-aluminum-water is placed in the bottom of a tube or hole filled with water the rate of diffusion of ammonium nitrate from a saturated solution or slurry of ammonium nitrate-ammonium *nitrate solution* upward into the water is exceedingly slow owing to the high density of the saturated ammonium nitrate solutions. Therefore, if the desired solution can be introduced at the bottom of a water filled borehole in which there is no tendency for water to flow in the borehole, the mixture will remain effectively unchanged for several days.

We have found that the water content has a pronounced effect on the sensitivity of the explosive. For example, ammonium-nitrate-aluminum-water mixtures exhibit a sharp sensitivity peak in the sensitivity vs. water content curve at about 8 to 10 percent water. This may be seen by the results shown below in Table I, Part a, summarizing results wherein 4" x 24" charges were shot with 1" diameter, 20 grams pressed tetryl boosters. The ammonium nitrate in this case was prilled and the aluminum was of fine, explosive grade having the following screen size (standard Tyler): 35–45 percent minus 325, 10–15 percent minus 200 to plus 325, 15–25 percent minus 100 to plus 200 and 20–30 percent plus 100, herein after referred to simply as fine Al. At each AN/Al ratio shown in Table I, Part a, the peak sensitivity occurred about midway between the maximum and minimum water content figures. The water content is expressed in parts by weight per 100 parts of dry powder.

TABLE I

| | | | | | |
|---|---|---|---|---|---|
| AN (prill) | 60 | 70 | 80 | 90 | 60 |
| Sodium nitrate | ------ | ------ | ------ | ------ | 10 |
| Al (fine, explosive grade) | 40 | 30 | 20 | 10 | 30 |
| Part (a).—1" diameter, 20 gram pressed tetryl booster | | | | | |
| Minimum water for detonation | 6 | 4 | 2 | 6 | ------ |
| Maximum water for detonation | 10 | 10 | 12 | 8 | 9 |
| Density at minimum water g./cc. | 1.09 | 1.06 | ------ | 1.08 | ------ |
| Density at maximum water | 1.23 | 1.06 | 1.06 | ------ | 1.34 |
| Part (b).—2" diameter, 160 gram cast 50/50 pentolite booster | | | | | |
| Minimum water for detonation | 4 | 3 | 1 | ------ | ------ |
| Maximum water for detonation | 12 | 12 | 12 | 10 | 9 |
| Density at minimum water | 1.03 | ------ | ------ | ------ | ------ |
| Density at maximum water | 1.20 | 1.06 | 1.06 | ------ | ------ |

mum range of 6 to 10 percent by first forming a water-ammonium nitrate solution of high concentration before adding the dry *powder* [power] and then pouring carefully blended dry mixtures into the solution. As will be described below an advantage can be obtained by blending coarse (e.g., predominantly −4+10 mesh) and fine aluminum and coarse (e.g., prill) and fine (e.g. −35 mesh) ammonium nitrate as this decreases water absorption. Table II shows the water content where ammonium nitrate and aluminum are poured into water whereas Table III shows the result of adding aluminum or a mixture of aluminum and ammonium nitrate to a saturated solution of ammonium nitrate. The same advantages can be obtained when the ammonium nitrate is partially replaced with sodium nitrate. There is also provided in accordance with this invention a composition including ammonium nitrate or a mixture of ammonium nitrate and sodium nitrate, a heat producing metal that will have a strong exothermic reaction with oxygen selected from the group consisting of aluminum, magnesium, boron, mixtures thereof and mixtures of aluminum and ferrosilicon and water. The ratio of the oxidizing substance [of] *to* said metal is in the range of 9/1 to 1/1 and said water is 6 to 14 percent of the composition and preferably between 6 and 10 percent of the composition.

TABLE II

[Density and water absorption of various AN-Al mixtures poured into water]

| Dry powder compositions | a | b | c | d | e | f | g | h | i |
|---|---|---|---|---|---|---|---|---|---|
| AN (prill) | ------ | 10 | 20 | 30 | 40 | 50 | 60 | 30 | ------ |
| AN (fine) | ------ | ------ | ------ | ------ | ------ | ------ | ------ | 30 | ------ |
| Al (course) S34 grade-about −4+10 mesh) | 100 | 90 | 80 | 70 | 60 | 50 | 40 | 40 | 50 |
| Al (fine explosive grade) | ------ | ------ | ------ | ------ | ------ | ------ | ------ | ------ | 50 |
| Final density | 1.39 | 1.39 | 1.45 | 1.39 | 1.43 | 1.43 | 1.44 | 1.46 | 1.69 |
| Final water content (percent) | 50 | 45.9 | 41.6 | 38.2 | 36.1 | 33.0 | 31.0 | 36.3 | 29.0 |

TABLE [II] *III*

[Density and water absorption of various AN-Al mixtures poured into 50/50 AN-water]

| Dry mixture | a | b | c | d | e | f | g | h | i | j | k | l | m | n | o | p | q |
|---|---|---|---|---|---|---|---|---|---|---|---|---|---|---|---|---|---|
| AN (prill) | ------ | 10 | 20 | 30 | 40 | 50 | 60 | 15 | 20 | 25 | ------ | 10 | 20 | 30 | 40 | 60 | 50 |
| AN (fine) | ------ | ------ | ------ | ------ | ------ | ------ | ------ | 15 | 20 | 25 | ------ | 10 | 20 | 30 | ------ | ------ | ------ |
| Al (coarse) | 100 | 90 | 80 | 70 | 60 | 50 | 40 | 70 | 60 | 50 | 50 | 40 | 30 | 20 | 30 | 20 | ------ |
| Al (fine) | ------ | ------ | ------ | ------ | ------ | ------ | ------ | ------ | ------ | ------ | 50 | 40 | 30 | 20 | 30 | 20 | 50 |
| Final density | 1.5 | 1.65 | 1.56 | 1.56 | 1.60 | 1.53 | 1.52 | 1.57 | 1.56 | 1.55 | 1.99 | 1.76 | 1.72 | 1.66 | 1.66 | 1.61 | 1.70 |
| Final water content (percent) | 27.6 | 24.0 | 19.5 | 17.0 | 17.0 | 16.5 | 15.4 | 20.0 | 17.0 | 15.0 | [63] 27 | 13.9 | 10.6 | 11.2 | 13 | 12.0 | 12.3 |

Additional shots, the results of which are given in Table I, Part b, made with much larger boosters and using mixtures with water contents above and below the maximum and minimum values given in Table I a showed relatively small difference in the range of water contents for detonation with the 160 g. 50/50 cast pentolite booster demonstrating the rapid fall off of sensitivity on either side of the optimum water content. It is evident from the results that the sensitivity of ammonium nitrate-aluminum-water mixtures of composition from 9/1 to 2/3 aluminum/ammonium nitrate (dry basis) using fine aluminum was optimum between 6 and 10 percent water.

This invention related primarily to the design of completely water soaked ammonium nitrate-aluminum mixtures that have water contents as nearly within this optimum range of 6 to 10 percent as possible. This condition, we have discovered, can be achieved by suitably blending the ammonium nitrate and the aluminum and introducing the dry mixture into previously prepared ammonium nitrate solutions in such manner as to form a final water soaked mixture in which the water content is at most 14 percent, preferably no more than 10 percent.

We have found in accordance with this invention, that the water content of completely water soaked mixtures can be held below 14 percent and approaching the opti- Thus, in accord with results in Table III our method of pouring blended 50/50 coarse-fine ammonium nitrate and 50/50 coarse-fine aluminum mixtures into ammonium nitrate solutions of high (approaching saturation) concentrations provides final compositions that not only contain near the optimum percentage of water, but owing to density and slow diffusion rate are completely protected for days against further water penetration when placed in the bottom of water filled boreholes. We have discovered moreover that slurries containing 20 to 50 parts (dry basis) blended coarse and fine aluminum and 80 to 50 parts blended coarse and fine ammonium nitrate poured into a saturated ammonium nitrate solution to give final ammonium nitrate-aluminum-water mixtures containing only 10 to 11 percent water, 15 to 40 percent aluminum and 74 to 50 percent ammonium nitrate, have densities of about 1.65±0.15 g./cc. and can be detonated consistently [consistenly] with cast 50/50 pentolite boosters ranging in size from 50 to 350 g. The following is an example of results obtained with a preferred mixture of this type.

Example I

Several shots were made using 60/40 blended ammonium nitrate (50/50 prill ammonium nitrate and fine (—35 mesh) ammonium nitrate)-blended aluminum (50/50 coarse—approximately 4 to 10 mesh—(S34) aluminum and fine—more than 90 percent thru 100 mesh, and more than 35 percent thru 325 mesh—aluminum) poured into a 50/50 ammonium nitrate-water solution in 9"(d) x 40"(L) tubes and boreholes. The final composition was 58.5/32.5/9 to [*57.5/31.5/11*] 57.5/31.5/11 ammonium nitrate, aluminum-water and the density was 1.7±0.06 g./cc. Shots made under an excess water "head" with booster consisting of 2"(d) x 2 to 4"(L) cast 50/50 pentolite) placed near the bottom of the charge produced very powerful detonations relative to comparable size TNT shots. When the charges were detonated in 9" boreholes with the bottom of the holes each 6 ft. below the surface earth craters, roughly hemispherical in shape, were obtained with a depth of about 8±1 ft. and diameter about 22±3 ft. It is estimated from theoretical computations that a 9"(d) x 40"(L) charge of this explosive weighing 70 kg. generated 125,000K cal. heat and a maximum available energy of about 95,000 which is equivalent to about 110 kg. of TNT at a density of 1.0 g./cc. That is, the computed heat of explosion of this mixture is about 1.8K cal./g. and the computed maximum available energy A about 1.3K cal./g. The relatively low A/Q ratio in the AN-Al-water slurries is associated with an appreciable n(condensed)/n(gas) ratio, where n is the number of mols of product of detonation per kilogram; explosives generating no condensed products of detonation have A/Q values near unity at high loading density.

When the diameter of the charge is increased the limits of water content at which detonation may be achieved in prilled ammonium nitrate-fine aluminum mixtures is also increased. For example, we have been able to detonate ammonium nitrate-aluminum-water mixtures containing up to about 20 percent water in 9"(d) x 24"(L) and longer charges. However, when the charge contains more than about 10 to 12 percent water the sensitivity becomes too low for practical considerations. Where conditions are such, therefore, that more than 12 percent water is present in the final mixture we have found it necessary to add an auxiliary sensitizer, such as coarse TNT. Thus when 5 percent minus 4 plus 6 mesh TNT was used in the 70/30 prilled ammonium nitrate-fine aluminum mixture the upper limit of tolerable water in the 4"(d)+24"(L) charges, detonated with the 20 g. pressed tetryl booster, was increased from 10 to 12 percent; with 10 percent coarse TNT, in the 80/20 mixture under the same conditions it was increased from 12 to 14 percent. Moreover, using 4"(d)+24"(L) charges and 2"(d) x 2"(L) (160 g.) 50/50 pentolite boosters, with 25 percent TNT in any ammonium nitrate-aluminum mixture from 100/0 to 60/40 we have found it possible to detonate the slurries with the maximum water content possible, namely about 18 percent. (If more water is added ammonium nitrate solution settles out of the slurries and the sensitivity then increases owing to a resulting increase in the final TNT content of the slurry.)

We have also discovered that mixtures of freshly mixed, fine grained ammonium nitrate and aluminum with more than 2 but less than about 8 percent water have very desirable plastic properties for blowing, augering, and/or tamping into small diameter boreholes whether in "uppers," in horizontal or in "down" holes. Moreover, shots made in 1½" boreholes using a mixture of 80/10/7/3 ammonium nitrate-aluminium-flour-water proved very successful. Therefore, the ammonium nitrate-aluminum-water mixtures described in this invention are not limited to large diameter boreholes, but under appropriate conditions may prove very valuable for small diameter shooting using mixtures that may be mixed on the spot and loaded into small diameter boreholes for [unground] *underground* metal and non-metal ore mining, and in other small diameter uses. Such mixtures may or may not require the use of small boosters. Where boosters are required we prefer the use of small (high detonation pressure) boosters such as pressed and cast pentolite, pressed tetryl, pressed RDX or RDX wax mixtures, and similar types.

Ferrosilicon, magnesium and boron are other metals that may be used advantageously, either in conjunction with aluminum or without aluminum in high ammonium nitrate-water explosives. Ferrosilicon does not itself sensitize ammonium nitrate-water mixtures sufficiently for use by itself but is a beneficial ingredient when aluminum and/or coarse TNT and/or other sensitizers are also present. Magnesium and boron are both quite as effective as aluminum in explosives of this type but are currently considerably more expensive.

We claim:

1. An explosive composition in slurry form consisting essentially of an oxidizing substance selected from the group consisting of ammonium nitrate, and mixtures of ammonium nitrate and sodium nitrate, a metal selected from the group consisting of aluminum, magnesium, boron, mixtures thereof and mixtures of aluminum and ferrosilicon, and water the ratio of the oxidizing substance to said metal being in the range 9/1 to 1/1 and said water 6 to 14 percent of the composition, said metal being a mixture of finely divided metal, 90 percent passing through 100 mesh, and coarse metal of 4 to 10 mesh, and said oxidizing substance being a mixture of fine oxidizing substance of —35 mesh, and coarse oxidizing substance of 4 to 10 mesh.

2. An explosive composition as in claim 1 in which said water is 6 to 10 percent of the composition.

3. An explosive composition in slurry form consisting essentially of ammonium nitrate, aluminum and water, the ratio of ammonium nitrate to aluminum being in the range 9/1 to 1/1 and said water being 6 to 14 percent of the composition, said aluminum being a mixture of fine aluminum, 90 percent passing through 100 mesh, and coarse aluminum of 4 to 10 mesh, and said ammonium nitrate being a mixture of fine ammonium nitrate of —35 mesh and coarse ammonium nitrate of 4 to 10 mesh.

4. A method of making an explosive composition in slurry form comprising the steps of forming a substantially saturated aqueous solution of ammonium nitrate and adding to said saturated aqueous solution a mixture of blended coarse ammonium nitrate of 4 to 10 mesh and fine ammonium nitrate of —35 mesh and blended coarse and fine aluminum to provide a slurry having a ratio of ammonium nitrate to aluminum of 9/1 to 1/1 and 6 to 14 percent of water.

5. An explosive composition comprising a slurry of solids in an aqueous solution of ammonium nitrate, said solids consisting essentially of ammonium nitrate particles and aluminum particles, said slurry having a density of about 1.5 to 1.8 grams per cubic centimeter, said slurry containing 6 to 14% by weight of water and the ratio of ammonium nitrate to aluminum in the composition being in the range of 9/1 to 1/1 by weight.

*6. An explosive composition in slurry form, comprising a suspension of solids in an aqueous solution in which the water is substantially saturated with inorganic nitrate, said suspended solids comprising undissolved particulate inorganic nitrate and particulate metal selected from the group which consists of aluminum, magnesium, boron, mixtures thereof and mixtures of aluminum with ferrosilicon, the inorganic nitrate in each case being selected from the group which consists of ammonium nitrate and mixtures of ammonium nitrate and sodium nitrate, the said particulate inorganic nitrate comprising at least 50 percent by weight of the total suspended solid inorganic nitrate and metal, the ratio of total inorganic nitrate to metal in the overall composition being with the range 9/1 to 1/1, and the metal being sufficient in quantity at least to sensitize said slurry to detonation in a column 9 inches in diameter and 40 inches long with a cast 50/50 pentolite booster 2 inches in diameter and 2 to 4 inches long.*

*7. An explosive composition comprising water in proportions of not less than 6 percent by weight and sufficient to form a slurry as distinguished from a solid mass, said water being substantially fully saturated with inorganic nitrate salt, a further quantity of inorganic nitrate salt being suspended in particulate solid form in said saturated water, each of said nitrates being selected from the group which consists of ammonium nitrate and mixtures of ammonium nitrate and sodium nitrate, and a sufficient quantity of particulate metallic aluminum also suspended in said saturated water to sensitize said composition to detonation by a small high detonation pressure booster, the quantity of aluminum being not greater than the solid nitrates and the density of the whole composition being below about 1.8 grams per cc.*

*8. An explosive composition in slurry form which comprises, as principal ingredients, an ammonium nitrate saturated aqueous solution, and solid matter comprising 50 to 80 parts by weight of particulate ammonium nitrate and 20 to 50 parts of particulate metallic aluminum, the saturated aqueous solution being sufficient in quantity to hold said solid matter in suspension, wherein the aluminum is the primary sensitizing agent for the slurry, the total nitrate comprising at least 50% of the total composition.*

*9. An explosive slurry composition comprising a substantially saturated aqueous solution of ammonium nitrate in sufficient quantity to form a slurry, a substantial quantity of solid inorganic nitrate above that normally soluble in said saturated solution, and finely divided metallic aluminum suspended in said slurry as the primary sensitizing agent in sufficient quantity to substantially increase sensitivity of the composition to detonation, the total nitrate comprising at least 50% of the total composition.*

*10. An explosive slurry composition comprising a substantially saturated solution of ammonium nitrate, and suspended solids in said solution to form said slurry, said solids being comprised of at least 50 parts by weight of inorganic nitrate selected from the group which consists of ammonium nitrate, sodium nitrate and mixtures thereof, and not more than 50 parts by weight of finely divided metallic aluminum of character such as to increase the sensitivity of said composition to detonation, the total nitrate comprising at least 50% of the total composition.*

*11. A slurry composition as in claim 10 wherein the aluminum is essentially the only sensitizer present.*

*12. A slurry composition according to claim 10 wherein the water comprises at least 6 percent by weight of the total composition.*

References Cited by the Examiner

The following references cited by the Examiner, are of record in the patented file of this patent or the original file.

UNITED STATES PATENTS

| | | | |
|---|---|---|---|
| 2,345,582 | 4/44 | Carey. | |
| 2,463,709 | 3/49 | McFarland. | |
| 2,703,528 | 3/55 | Lee et al. | |
| 2,829,958 | 4/58 | Davidson et al. | |
| 2,836,484 | 5/58 | Streng et al. | 149—43 X |
| 2,867,172 | 1/59 | Hradel | 149—92 X |

CARL D. QUARFORTH, *Primary Examiner.*

BENJAMIN R. PADGETT, *Examiner.*

Notice of Adverse Decisions in Interferences

In Interference No. 95,416 involving Re. Patent No. 25,695, M. A. Cook and H. E. Farnam, Jr. EXPLOSIVE COMPOSITION COMPRISING AMMONIUM NITRATE AND HEAT-PRODUCING METAL, final judgment adverse to the patentees was rendered May 29, 1969, as to claim 9.

[*Official Gazette May 8, 1973.*]